United States Patent
Schemmann et al.

(10) Patent No.: US 7,889,353 B2
(45) Date of Patent: Feb. 15, 2011

(54) METHOD OF MEASURING RELATIVE MOVEMENT OF AN OBJECT AND AN OPTICAL INPUT DEVICE OVER A RANGE OF SPEEDS

(75) Inventors: Marcel Schemmann, Maria Hoop (NL); Carsten Heinks, Nordhorn (DE); Paraskevas Dunias, Eindhoven (NL); Aalbert Stek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 313 days.

(21) Appl. No.: 12/064,642

(22) PCT Filed: Aug. 24, 2006

(86) PCT No.: PCT/IB2006/052948

§ 371 (c)(1),
(2), (4) Date: May 30, 2008

(87) PCT Pub. No.: WO2007/026293

PCT Pub. Date: Mar. 8, 2007

(65) Prior Publication Data

US 2008/0225300 A1   Sep. 18, 2008

(30) Foreign Application Priority Data

Aug. 30, 2005   (EP) .................................. 05107937

(51) Int. Cl.
*G01B 11/02* (2006.01)
*G01P 3/36* (2006.01)
(52) U.S. Cl. ...................... 356/498; 356/28.5
(58) Field of Classification Search ................ 356/28.5, 356/498, 486
See application file for complete search history.

(56) References Cited

U.S. PATENT DOCUMENTS

| 3,511,150 | A | 5/1970 | Whitney et al. | |
|---|---|---|---|---|
| 4,455,452 | A | 6/1984 | Schuyler | |
| 6,233,045 | B1 * | 5/2001 | Suni et al. | 356/28.5 |
| 6,707,027 | B2 * | 3/2004 | Liess et al. | 250/221 |
| 6,872,931 | B2 * | 3/2005 | Liess et al. | 250/221 |
| 7,268,705 | B2 * | 9/2007 | Kong | 341/31 |
| 7,339,683 | B2 * | 3/2008 | Weijers et al. | 356/519 |
| 7,492,351 | B2 * | 2/2009 | VanWiggeren et al. | 345/157 |
| 2002/0104957 | A1 * | 8/2002 | Liess et al. | 250/221 |

(Continued)

FOREIGN PATENT DOCUMENTS

EP   0660258 B1   3/2000

(Continued)

*Primary Examiner*—Patrick J Connolly

(57) ABSTRACT

A method and optical module for measuring relative movement of an input device and object (15) along at least one measuring axis. A laser device (3) having a laser cavity is provided for generating a measuring beam (13) in respect of each measuring axis. The measuring beam (13) is used to illuminate the object (15) and measuring beam radiation reflected from the object (15) and re-entering the laser cavity generates a self-mixing effect in the laser and causes changes in operation of the laser cavity. A detector (4) is used to generate a measurement signal representative of these changes and an electronic processing circuit (18) selects, in dependence on the speed of relative movement, one of at least two parameters of the measurement signal for use in determining the speed and direction of relative movement.

20 Claims, 5 Drawing Sheets

U.S. PATENT DOCUMENTS

| | | | |
|---|---|---|---|
| 2003/0006367 A1* | 1/2003 | Liess et al. | 250/221 |
| 2003/0231319 A1* | 12/2003 | Zhang et al. | 356/640 |
| 2005/0001817 A1 | 1/2005 | Lauffenburger et al. | |
| 2005/0062955 A1 | 3/2005 | Dienes | |
| 2005/0134556 A1* | 6/2005 | VanWiggeren et al. | 345/156 |
| 2005/0156874 A1* | 7/2005 | Kong | 345/156 |
| 2005/0156875 A1* | 7/2005 | Kong | 345/156 |
| 2005/0157971 A1* | 7/2005 | Juijve et al. | 385/12 |
| 2005/0213106 A1* | 9/2005 | Weijers et al. | 356/519 |
| 2005/0243053 A1* | 11/2005 | Liess et al. | 345/156 |
| 2006/0152494 A1* | 7/2006 | Liess | 345/169 |
| 2007/0164201 A1* | 7/2007 | Liess et al. | 250/221 |
| 2007/0165130 A1* | 7/2007 | Cobben et al. | 348/335 |
| 2007/0206180 A1* | 9/2007 | Liess | 356/28 |
| 2008/0007713 A1* | 1/2008 | Zijp | 356/51 |
| 2008/0225300 A1* | 9/2008 | Schemmann et al. | 356/450 |
| 2009/0212201 A1* | 8/2009 | Duijve et al. | 250/221 |
| 2009/0303458 A1* | 12/2009 | Heinks et al. | 356/5.09 |
| 2010/0134803 A1* | 6/2010 | Baier et al. | 356/498 |

FOREIGN PATENT DOCUMENTS

| | | |
|---|---|---|
| WO | 03102751 A2 | 12/2003 |
| WO | 2004021158 A2 | 3/2004 |

* cited by examiner

METHOD OF MEASURING RELATIVE MOVEMENT OF AN OBJECT AND AN OPTICAL INPUT DEVICE OVER A RANGE OF SPEEDS

The invention relates to a method of measuring movement of an input device and object relative to each other along at least one measuring axis, the method comprising the steps of illuminating an object surface with a measuring laser beam, emitted from the laser cavity of a laser device, for each measuring axis, measuring changes in operation of the laser cavity, said changes being due to self-mixing interference of measuring beam radiation re-entering said laser cavity and an optical wave in said laser cavity and being representative of said movement along said at least one measuring axis, and generating an electric signal representative of said measured changes in operation of said laser cavity.

The invention also relates to an input device provided with an optical module for carrying out the method, and to an apparatus comprising such an input device.

Such a method and input device are known from U.S. Pat. No. 6,707,027. The input device may be an optical mouse used in a computer configuration to move a cursor across the computer display or monitor, for example, to select a function of a displayed menu. Such an optical mouse is moved across a mouse pad by hand, like a conventional mechanical mouse. The input device may also be an "inverted" optical mouse. The input device is then stationary and, for example, built in to the keyboard of a desktop computer or in a notebook computer or in a handheld apparatus like a mobile phone, a PDA or gaming apparatus, and the object is a user's finger which is moved over a transparent window in the housing of the input device. In the latter applications, optimum use is made of the advantages of the input device, namely that it is small, light-weight, low cost and consumes little power.

FIG. 1 is a diagrammatic cross-section of an input device described in U.S. Pat. No. 6,707,027. The device comprises, at its lower side, a base plate 1, which is a carrier for the diode lasers, in the described embodiment VCSEL lasers, and the detectors, for example, photo diodes. In FIG. 1a, only one diode laser 3 and its associated photo diode 4 is visible, but usually at least a second diode laser 5 and associated detector 6 is provided on the base plate, as shown in FIG. 1b which is a diagrammatic plan view of the device. The diode lasers 3, 5 emit measuring beams 13 and 17 respectively. At its upper side, the device is provided with a transparent window 12 across which an object, for example, a human finger is moved. A lens 10, for example, a plano-convex lens, is arranged between the diode lasers and the window. This lens focuses the laser beams 13, 17 at or near the upper side of the transparent window 12. If an object 15 is present at this position, it scatters the beam 13 (and 17). A part of the radiation beam 13 is scattered in the direction of the illumination beam 13 and this part is converged by the lens 10 on the emitting surface of the diode laser 3 and re-enters the laser cavity thereof. As will be explained later, the radiation re-entering the laser cavity induces changes in the intensity of radiation emitted by the diode laser. These changes can be detected by the photo diode 4, which converts the measured changes into an electric signal, and applies the electric signal to an electronic circuit 18 for processing. Similarly, the photo diode 6 converts the measured changes in the intensity of radiation emitted by the diode laser 5 into an electric signal and applies this electric signal to another electronic circuit 19 for processing. As shown in FIG. 1b, the electronic circuits 18, 19 are interconnected. Various degrees of integration of laser and detector are possible, including monolithic integration.

FIG. 2 illustrates the principle of the input device and method of measuring relative movement described in U.S. Pat. No. 6,707,027, when a horizontal emitting diode laser and monitor photo diode arranged at the rear facet of the laser are used. In FIG. 2, the diode laser, for example, diode laser 3, is schematically represented by its cavity 20 and its front and rear facets, or laser mirrors 21 and 22 respectively. The cavity has a length L. The space between the object 15 and the front facet 21 forms an external cavity, which has a length $L_0$. The laser beam emitted through the front facet is denoted by reference numeral 25 and the radiation reflected by the object in the direction of the front facet is denoted by reference numeral 26. Part of the radiation generated in the laser cavity passes through the rear facet and is captured by the photo diode 4.

If the object 15 moves in the direction of the illumination beam 13, the reflected radiation 26 undergoes a time varying phase delay and Doppler shift. This means that the frequency (and thus phase) of this radiation changes or a frequency shift occurs. This frequency shift is dependent on the speed at which the object moves and is of the order of a few kHz to MHz. The frequency-shifted radiation re-entering the laser cavity interferes with the optical wave, or radiation generated in this cavity, i.e. a self-mixing effect occurs in the cavity. Dependent on the amount of phase shift between the optical wave and the radiation re-entering the cavity, this interference will be constructive or negative, i.e. the intensity of the laser radiation is increased or decreased periodically. The frequency of the laser radiation modulation generated in this way is exactly equal to the difference between the frequency of the optical wave in the cavity and that of Doppler-shifted radiation re-entering the cavity. The frequency difference is of the order of a few kHz to MHz and is thus easy to detect. The combination of the self-mixing effect and the time varying phase shift of the reflected light causes a variation in the operation of the laser cavity and, in particular, its gain, or light amplification, and output powers at each mirror vary.

The gain variation $\Delta g$ as a function of the speed v of movement of the object is given by the following equation:

$$\Delta g = -\frac{K}{L} \cdot \cos \cdot \left\{ \frac{4\pi \cdot \upsilon \cdot v \cdot t}{c} + \frac{4\pi \cdot L_0 \cdot t}{c} \right\} \qquad \text{Eq 1}$$

In this equation:
K is the coupling coefficient to the external cavity; it is indicative of the quantity of radiation coupled out of the laser cavity;
$\upsilon$ is the frequency of the laser radiation;
v is the speed of movement of the object in the direction of the illumination beam;
t is the moment of time; and
c is the light velocity.

As well as the speed of movement of the object and the amount of movement, i.e. the distance across which the object is moved and which can be measured by integrating the measured speed with respect to time, the direction of movement also needs to be detected, whether the object moves forward or backward along the measuring axis.

In one proposed method of determining the direction of movement, use is made of the fact that wavelength λ of the laser radiation is dependent on the temperature of, and thus the current through, the diode laser. If, for example, the temperature of the diode laser increases, the length of the laser cavity increases and the wavelength of the radiation that is amplified increases. Curve 45 of FIG. 3 shows the temperature ($T_d$) dependency of the wavelength $\lambda$ of the emitted radiation.

If, as is shown in FIG. 4, a periodic drive current $I_d$ (represented by the waveform 50) is supplied to the diode laser, the temperature $T_d$ of the diode laser rises and falls periodically, as shown by waveform 52. This results in a standing optical wave in the laser cavity which has a periodically varying frequency, and thus a continuously varying phase shift with respect to the radiation reflected by the object and re-entering the cavity with a certain time delay. In every half-period of the drive current, there are now successive time segments wherein the diode laser gain is higher and lower, depending on the phase relation of the wave in the cavity and the reflected radiation re-entering the cavity. This results in a time-dependent intensity variation (I) of the emitted radiation as shown by waveform 54 in FIG. 4. This waveform represents the situation for a stationary, or non-moving object. The number of pulses in a first half-period ½p(a) is equal to the number of pulses in a second half-period ½p(b).

A movement of the object causes a varying time shift of the radiation re-entering the laser cavity, i.e. this frequency increases or decreases depending on the direction of movement with the Doppler shift frequency. A movement of the object in one direction, the forward direction, causes a decrease in the wavelength of the re-entering radiation, and a movement in the opposite direction causes an increase in the wavelength of the re-entering radiation. The effect of the periodic frequency modulation of the optical wave in the laser cavity is that, in case the Doppler shift frequency has the same sign as the frequency modulation in the laser cavity, the effect of the Doppler-shifted radiation re-entering the cavity is different from the effect this radiation has in case the frequency modulation and Doppler shift frequency have opposite signs. If the two frequency shifts have the same sign, the phase difference between the wave and the re-entering radiation changes at a slow rate, and the frequency of the resulting modulation of the laser radiation is lower. If the two frequency shifts have opposite signs, the phase difference between the wave and the radiation changes at a faster rate, and the frequency of the resulting modulation of the laser radiation is higher. During a first half-period ½p(a) of the driving laser current, the wavelength of the generated laser radiation increases. In the case of a backward moving object, the wavelength of the re-entering radiation also increases, so that the difference between the frequencies of the wave in the cavity and that of the radiation re-entering this cavity is lower. Thus, the number of time segments during which the wavelength of re-entering radiation is adapted to the wavelength of the generated radiation is smaller than in the case of absence of electrical modulation of the emitted laser radiation. This means that if the object moves in the backward direction, the number of pulses in the first half-period is smaller than in the case where no modulation is applied. In the second half-period ½p(b), wherein the laser temperature and the wavelength of the generated radiation decrease, the number of time segments wherein the wavelength of the re-entering radiation is adapted to that of the generated radiation increases. Thus, for a backward moving object, the number of pulses in the first half-period is smaller than the number of pulses in the second half-period. This is illustrated by the waveform 58 of FIG. 5, which shows the intensity $I_b$ of the laser radiation emitted if the object moves in the backward direction. Comparing this waveform with waveform 54 of FIG. 4 shows that the number of pulses in the first half-period has decreased, and the number of pulses in the second half-period has increased.

It will be clear from the above that if the object moves in the forward direction, in which the wavelength of radiation scattered by the object and re-entering the laser cavity decreases due to the Doppler effect (object moving towards laser, positive Doppler shift, number of wavelengths fitting between laser and target decreasing, number of wavelengths fitting between laser and target also decreasing due to laser wavelength increase), the number of pulses in the first half-period ½p(a) is larger than the number of pulses in the second half-period ½p(b). This can be verified by comparing waveform 56 of FIG. 5, representing the intensity $I_f$ of the radiation emitted in the case of a forward moving object. In an electronic processing circuit, the number of photo diode signal pulses counted during the second half-period ½p(b) is subtracted from the number of pulses counted during the first half-period ½p(a). If the resulting signal is zero, the object is stationary. If the resulting signal is positive, the object moves in the forward direction and if the signal is negative, the object moves in the backward direction. The resulting number of pulses is proportional to the speed of movement in the forward and backward directions respectively.

Thus, in summary and as described above, in order to determine the direction of relative movement of the object and the device along a measuring axis, the electrical drive current supplied to the laser is a periodically varying electrical current, for example, a current with triangular shaped periods. Due to this laser modulation, the measured signal shows higher frequency, also called "offset frequency", undulations superposed on the rising an falling slopes of the triangles. If the frequency on the rising slopes is equal to the frequency on the falling slopes, the object is stationary with respect to the device. If the object moves, the offset frequency on the rising slopes is larger or smaller than the offset frequency on the falling slopes, depending on the direction of movement along the measuring axis. The offset frequency has a value that is determined by the modulation rate of the laser current and the distance between the device and the object. To measure movement of the object with respect to the device, the offset frequency of the detector output signal is determined, i.e. a frequency analysis is carried out during a given measurement time. For the offset frequency measurement, a Fourier analysis (FFT) or other frequency- or phase-tracking method, for example, using comparing and counting means, can be used.

In a number of the above-mentioned applications, particularly if the input device is to be used in gaming apparatus and the like, the device should allow for measurement of movement over a wide range of speeds, say four orders of magnitude, for example, from 0.1 mm/sec to 1 m/sec. If any speed within the range of four orders of magnitude is required to be measured by means of frequency measurement of one sample, a large number, of the order of $2^{16}$, measuring points in this sample should be analysed or correlated. This means that the computation process required to process the resultant data set is very intensive and the measurement time for a single sample will be unacceptably long. As a consequence of this long measurement time, the laser-drive frequency, or modulation rate, needs to be very low but this results in the frequency offset, which is required to determine the direction of movement, being very small. On the other hand, if the speed of movement is greater than the offset frequency, it is impossible to determine the direction of movement from this type of measurement.

It is therefore an object of the present invention to provide a method and device of the type defined above which allows the determination of both speed and direction of relative movement over a wide range of speeds within a practical measurement time and with moderate computation effort for each measurement.

In accordance with the present invention, there is provided a method of measuring movement of an input device and object relative to each other along at least one measuring axis, the method comprising the steps of illuminating an object surface with a measuring laser beam, emitted from the laser cavity of a laser device, for each measuring axis, generating a measurement signal representative of changes in operation of the laser cavity, said changes being due to interference of measuring beam radiation re-entering said laser cavity and an optical wave in said laser cavity and being representative of said movement along said at least one measuring axis, selecting, in dependence on the speed of movement of said input device and said object relative to each other, one of at least two parameters of said measurement signal and determining from said selected parameter the speed and direction of said movement, and generating an electric signal representative of said speed and direction of movement.

Also in accordance with the present invention, there is provided an optical module for performing a method of measuring movement of an input device and object relative to each other along at least one measuring axis, the optical module comprising a laser device for each measuring axis, said laser device having a laser cavity for generating a measuring laser beam, means for illuminating an object surface with said a measuring laser beam, detector means for generating a measurement signal representative of changes in operation of the laser cavity, said changes being due to interference of measuring beam radiation re-entering said laser cavity and an optical wave in said laser cavity and being representative of said movement along said at least one measuring axis, and electronic processing means for selecting, in dependence on the speed of movement of said input device and said object relative to each other, one of at least two parameters of said measurement signal, determining from said selected parameter the speed and direction of said movement and generating an electric signal representative of said speed and direction of movement.

The present invention extends to an input device including an optical module as defined above.

Beneficially, one of said at least two parameters comprises a phase difference between corresponding events in successive portions of said measurement signal, and preferably another of said at least two parameters comprises an offset frequency superposed on said measurement signal. In a preferred embodiment, said method is for use in measuring speed of movement within a range of speeds, and said phase difference between corresponding events in successive portions of said measurement signal is selected for determination of speed and direction of movement for a set of lower speeds, beneficially including the lowest speed, in said range. Preferably, said offset frequency is selected for determination of speed and direction of movement for a set of higher speeds, beneficially including the highest speed, in said range.

In a preferred embodiment, a modulated drive current is applied to said laser device, such that said measurement signal is modulated accordingly, said modulated measurement signal including a rising portion and a falling portion in each period thereof. Preferably, said drive current is adjusted in dependence on the speed of movement of said input device and said object relative to each other. Beneficially, when the speed of movement is in a first set of speeds, including said highest speed, in said range, said drive current comprises a burst of pulses at a first modulation rate and the speed and direction of movement is determined by comparing the offset frequency of a rising portion of said measurement signal with that of a falling portion in the same period of said measurement signal. When said speed of movement is in a second set of speeds, between a first speed lower than said highest speed and a second speed higher than said lowest speed, the modulation rate of said burst of pulses is beneficially reduced to a second modulation rate, lower than said first modulation rate, the ratio of said second modulation rate to said first modulation rate preferably being dependent on the reduction in speed. This lower modulation rate provides a higher resolution than the higher modulation rate. In this case, the speed and direction of movement is, once again, beneficially determined by comparing the offset frequency of a rising portion of said measurement signal with that of a falling portion in the same period of said measurement signal.

When the speed of movement is in a third set of speeds, between a first speed lower than said highest speed and a second speed higher than said lowest speed and including speeds lower than those in said second set of speeds, the drive current preferably comprises a burst of pulses having at least two different modulation rates within a burst, wherein the speed and direction of movement is preferably determined by comparing the offset frequency of two or more rising portions, or two or more falling portions, in successive periods of said measurement signal.

When the speed of movement is in a fourth set of speeds, between a first speed lower than said highest speed and a second speed and including speeds lower than those in said third set of speeds, said drive current preferably comprises a plurality of bursts of pulses with a time interval therebetween, and the speed and direction of movement is beneficially determined by determining the phase difference of corresponding events in successive bursts of the resultant measurement signal, wherein said events preferably have a greater periodicity than that of the rising and falling portions of said measurement signal. Beneficially, the modulation rate of said bursts of pulses is varied according to said speed of movement, with lower modulation rates preferably being included when said speed is in a set of speeds including said lowest speed.

The present invention is based on the principle that by using larger-period events in the measuring signal, i.e. the signal from a radiation-sensitive detector such as a photo diode, to determine speed and direction of movement, the resolution for lower speeds can be substantially increased. The resolution for the lower and lowest speed increases with an increase in time interval between successive selected events. The events are caused by the shape and periodicity of the electrical drive current supplied to the laser and may include rising an falling slopes, successive pulses within a burst of pulses and successive bursts of pulses.

Thus, by using frequency measurements for the highest and higher speeds and phase measurement for the lower and lowest speed, the range of speeds that can be measured is substantially increased relative to the prior art.

These and other aspects of the present invention will be apparent from, and elucidated with reference to, the embodiments described herein.

Embodiments of the present invention will now be described by way of examples only and with reference to the accompanying drawings, in which:

FIG. 1b is a schematic plan view of the device of FIG. 1a;

Thus, the electronic processing circuit for generating an electric signal representative of the speed and direction of movement is arranged to perform the required measurement by means of a selected one of a number of methods, depending on the speed of the movement.

Figure 1A:
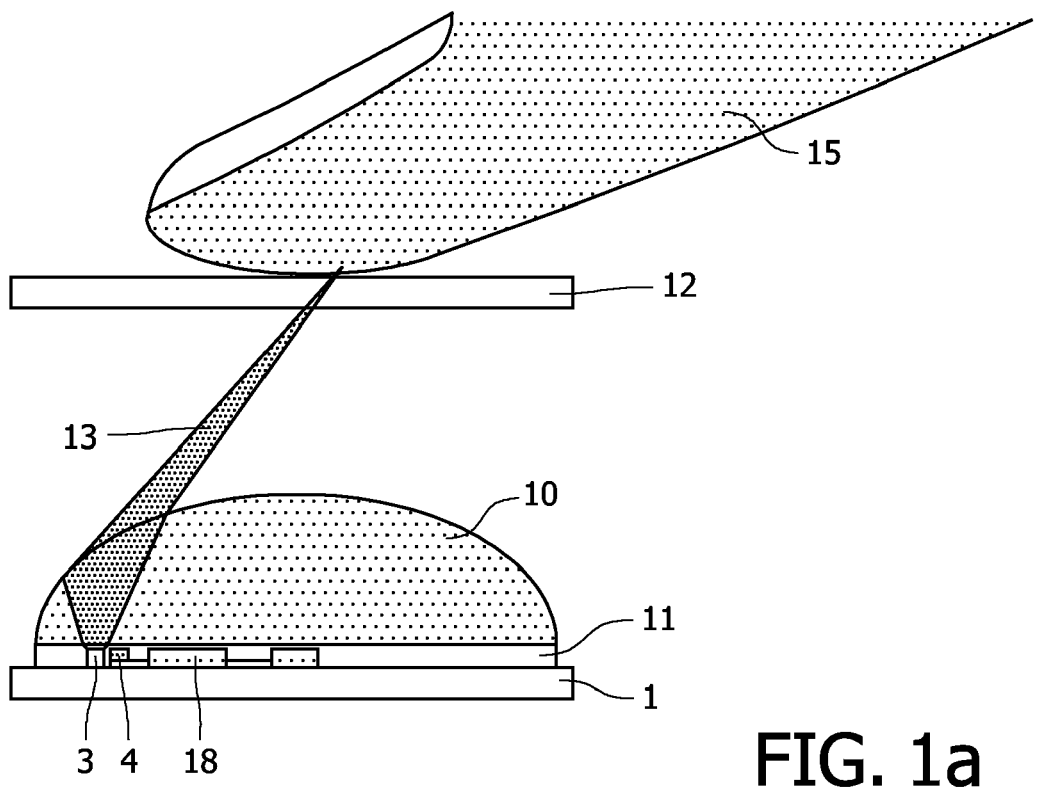
FIG. 1a is a schematic cross-sectional view of an input device.
Figure 1B:
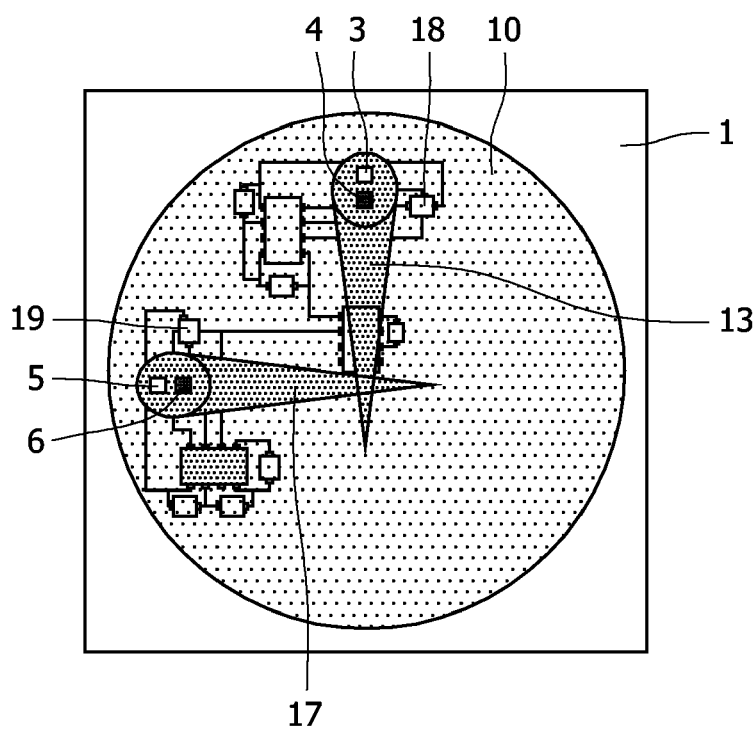
Figure 2:
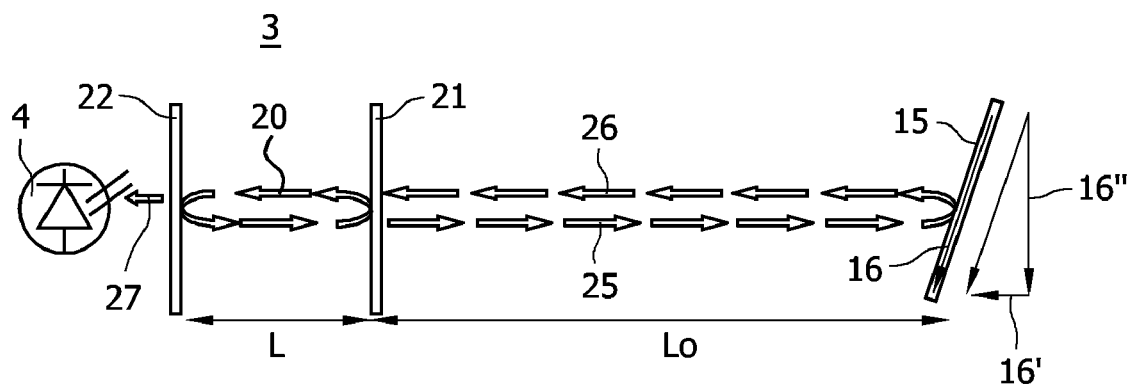
FIG. 2 illustrates the principle of the measuring method of the input device of FIG. 1a and 1b.
Figure 3:
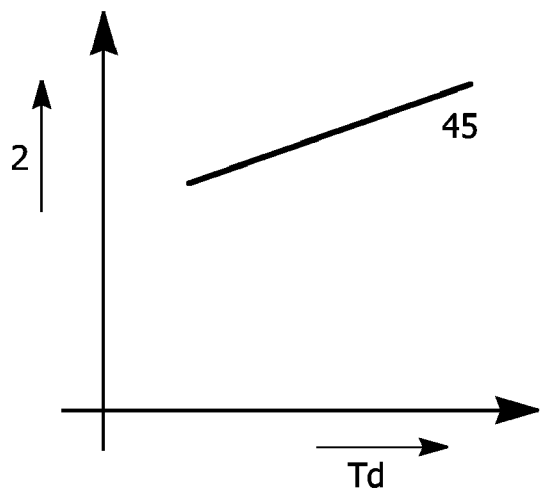
FIG. 3 illustrates the variation of laser wavelength as a function of temperature of the laser with optical feedback.
Figure 4:
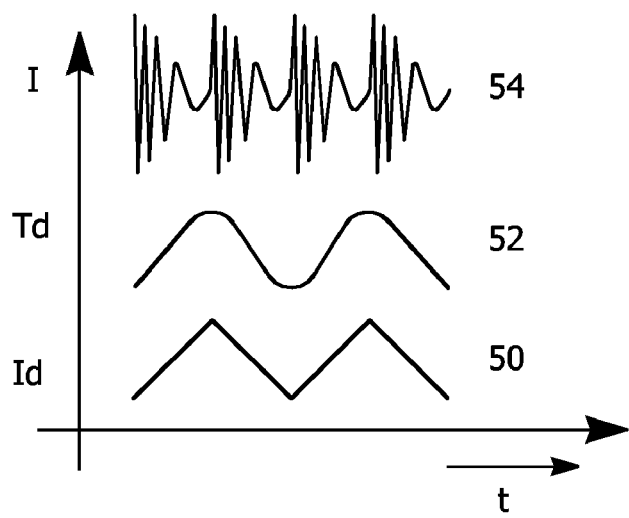
FIG. 4 illustrates the effect of use of a periodically varying drive current for a laser.
Figure 5:
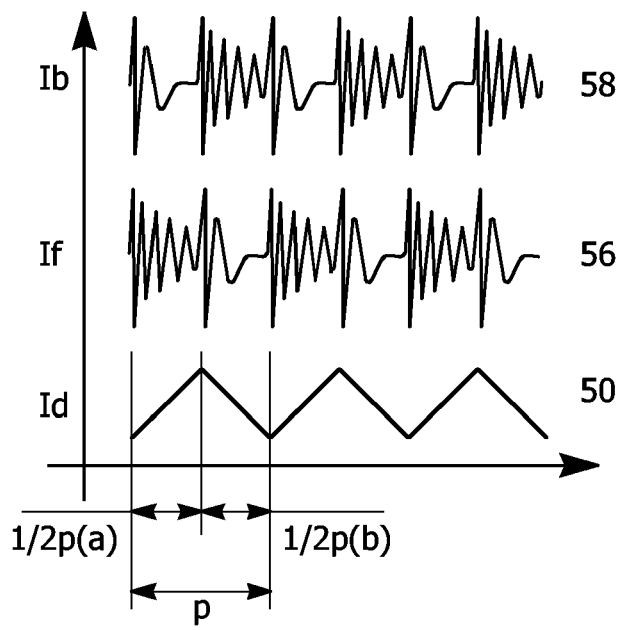
FIG. 5 illustrates how the direction of movement can be detected.
Figure 6:
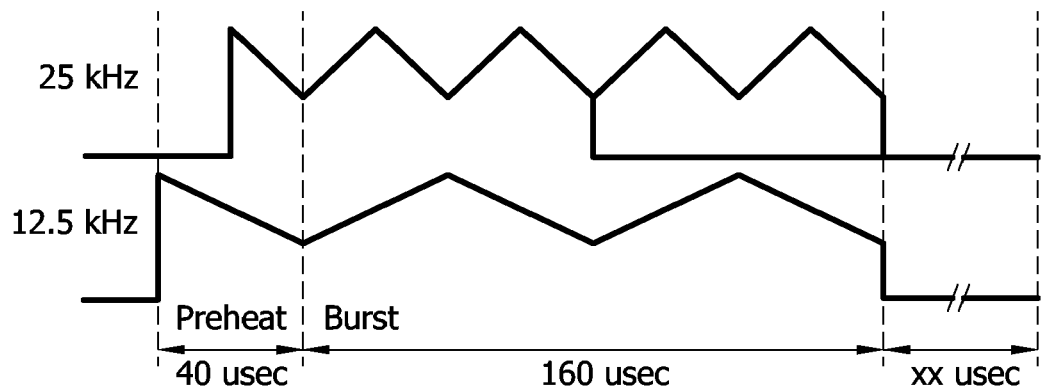
FIG. 6 is a schematic diagram illustrating a laser drive current comprising a burst of pulses at two different modulation rates, 25 kHz and 12.5 kHz.

In a first method, the above-described process of comparing the offset frequency of a rising slope of the measurement signal with the offset frequency of a falling slope of the same period is used to determine the speed and direction of movement. This method is selected for use when the speed of movement is at the highest and higher speeds within the desired range of speeds required to be covered. In addition, in order to increase the range of speeds that can be accommodated using this method, the modulation rate of the laser drive current is adapted in dependence on the momentarily measured speed of movement. Thus, for the expected maximum (or "highest") speed of movement (e.g. 1 m/sec), the modulation rate of the periodically varying laser drive current (e.g. the triangular shaped drive current $I_d$ of FIG. 5) is set to a maximum, say 25 kHz so that the offset frequency of the detector undulations caused by the laser modulation is optimum for the highest speed in the range. During a slope, a number of samples (say 128) are taken and analysed (using Fourier analysis or any other suitable analysis method), whereby the offset frequency of a rising slope is compared with the offset frequency of a falling slope of the same period. It will be appreciated that, in addition to a rising and falling slope, a period of the laser drive current (and, therefore, the resultant detector signal) may also have segments of constant amplitude, i.e. horizontal sections between the slopes. For speeds lower than the maximum, the modulation rate and, thus, the offset frequency can be decreased proportionally in, say, four steps. For example, if the momentarily measured speed of movement is half the highest speed, the modulation rate would be reduced to half of the maximum modulation rate so as to maintain the offset frequency at a reasonable ratio to the measured speed. As a result, a measuring range of an order of magnitude, between the highest speed and a speed which is around an order of magnitude lower than the highest speed, is obtained within which the speed and direction of movement can be determined in an accurate and reliable manner. The speeds in this upper range of speeds, between the highest speed and a speed which is around an order of magnitude lower than the highest speed, are also referred to herein as "higher" speeds. Thus, this first method of speed and direction determination is considered most suitable for the highest and higher speeds of movement, and is selected for use by the electronic processing circuit (or "controller") when the speed of movement is in this range. A second method of speed and direction determination is proposed for use within a medium range of speeds so as to further enlarge, by more than an order of magnitude, the range of speeds that can be accurately and reliably handled. In the proposed second method, the laser drive current is configured as bursts of pulses, with different modulation rates being used within a burst. Referring to FIG. 6 of the drawings, two types of burst at 25 kHz and 12.5 kHz modulation rate respectively are shown. The phase relation between successive segments (slopes) is dependent on the time delay between these segments and this is scaled by a factor of 2 in this example. Thus different undulation (or offset) frequencies are imparted to successive periods of the measurement signal. Instead of using the undulations of the rising and falling slope of the same period for processing, as in the first method described above, this time the undulations of successive rising or falling slopes are used for processing. The results of Fast Fourier Transform (FFT) of these undulations are mutually correlated (up-up phase or down-down phase correlation), for example, by correlating the complex phase of the FFT results. Since the interval between two rising slopes or two falling slopes is larger than the interval of a rising and falling aslope of the same period, and since the measurement resolution is inversely proportional to the interval between the measured results, the FFT resolution can be significantly enhanced relative to the result based on frequency measurement of a rising slope and successive falling slope of the same period (up-down measurement). Thus, by varying the frequency of modulation by a factor 8, the range of speeds that can be accurately and reliably accommodated is further enlarged by more than one order of magnitude.

In order to eliminate the offset frequency that may arise, which uncertainty may reach a value equal to an integer of half the FFT resolution, this method may be further be characterised in that the different modulation rates within a burst are adapted to correspond with the momentarily measured speed, as in the first method described above.

Both of the above methods use regular burst operation modes. In this exemplary embodiment of the invention, and referring to FIG. 6 of the drawings, a burst should comprise at least two cycles or periods, so that the time duration of this burst is equal to at least 200 μsec (at the 12.5 kHz modulation rate) plus the computation time following the burst.

In a third method, suitable for a lower range of speeds, down to a lowest speed in the required range, the phase difference between corresponding events in successive bursts is determined, wherein use is made of the fact that there is also a correlation between the FFT data of successive bursts. By using this data, a resolution can be obtained that is inversely proportional to the interval between bursts. This resolution is, in principle, an order of magnitude better than the resolution obtained from correlating data from events within one burst.

This third method employs a second type of burst operation, which includes measurement and comparing successive bursts, and will be referred to herein as inter-burst (IB) measurement. In order to establish a small, scalable time interval between the bursts, a burst will typically have only two periods, even at the modulation rate of 25 kHz. Thus, the required minimum separation between a pair of bursts is 100-150 μsec. Comparing this value with the up-up interval or down-down interval for phase measurements at 40 μsec and 80 μsec for 25 kHz and 12.5 kHz respectively indicates that a good overlap between phase detection regions may be expected for smaller IB intervals. However, to allow for measurements of the lowest speed, say 0.1 mm/sec, it is preferred to have up to at least 500 μsec or even 1 msec spacing between the inter-burst phase measurements. An object displacement of 50 nm displacement between successive bursts causes a phase difference of about 0.35 radians angle, which is 20 degrees.

In general, using phase results for obtaining a refined, or a more sensitive, phase type measurement requires that the standard deviation σ of the coarse phase type is small enough. For good measurements this is between 2 and 10% so that 3σ would be 6-30%. This should correspond to a value smaller than π for the sensitive phase scale. This means that the coarse scale should be not more than 3.3 coarser than the fine scale. This puts a maximum limit of about 3.3 on the ratio of interval times associated with coarse and fine phase results respectively. Starting from U&D (successive up-down segments) and UU and/or DD frequency measurement results at modulation rates, the value is about 2. when going from 12.5 kHz UU/DD measurement to 25 kHz IB measurement, a ratio of 3.3 is desired, which corresponds to an interval of 260 μsec. Then for a 12.5 kHz IB measurement, and interval of 850 μsec is required.

Figure 7:
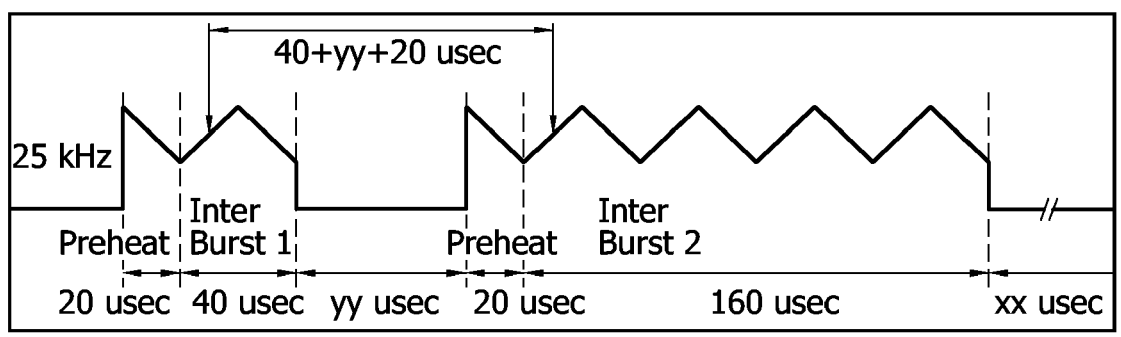
FIG. 7 is a schematic diagram illustrating a modulation scheme for use in an exemplary embodiment of the present invention using inter-burst operation.

The above method uses speed selection to combine 12.5 kHz and 25kHz results. As a result, a larger amount of radiation energy is used than is needed in principle, because for an inter-burst measurement, only the interval between bursts is a relevant parameter and not the modulation rate. Thus, a high modulation rate can be used and an alternative modulation scheme considered, as illustrated in FIG. 7 of the drawings. In the illustrated scheme, the first burst of an inter-burst measurement is minimised to a single modulation. This enables the shortest time to be used between inter-burst results and therefore, in general, allows refining the short inter-burst with the UU/DD result of the same frequency. Then, speed results are obtained by combining this inter-burst with a long inter-burst of the same frequency to measure even lower speeds. Or, alternatively, the burst train for an inter-burst measurement may consist of a number of short bursts with decreasing interval, which are succeeded by a longer burst that yields UU/DD data, such that in one measurement the lowest speeds can be accurately and reliably determined even with a high modulation rate. This type of measurement, which requires adaptation of acquisition and speed selection, may be used to limit radiation energy, and thus power consumption, to the minimum with inter-burst measurements at a modulation rate of 50 kHz.

Thus, in summary, in the above-described exemplary embodiment of the invention, selection of the type of burst operation of the laser is based on the estimated speed. For the highest speeds, no phase data is needed and it is sufficient to modulate at the highest modulation rate, say, 25 kHz. For higher speeds, only data from the frequency measurement at a lower modulation rate, say 12.5 kHz, which provides a higher resolution, is used. Both of these modes, E and D respectively, are normal, single modulation rate, burst modes.

Figure 8:
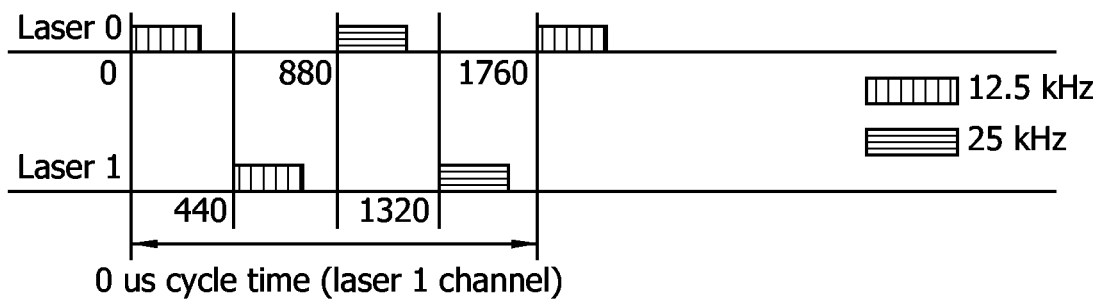
FIG. 8 illustrates schematically a burst plan for measurement mode C in an exemplary embodiment of the present invention.
Figure 9:
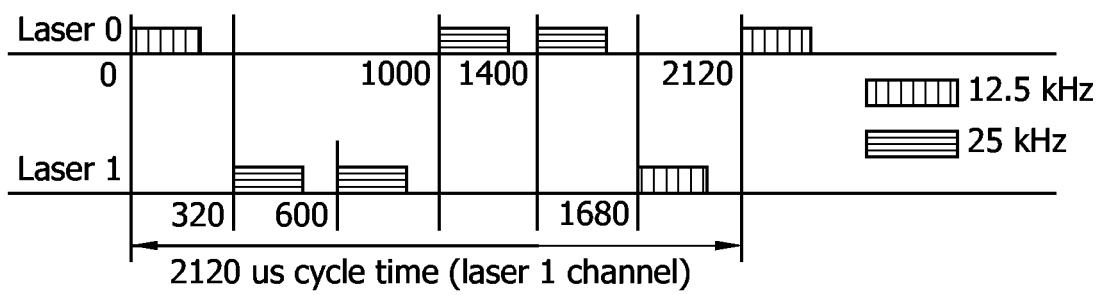
FIG. 9 illustrates schematically a burst plan for measurement mode B in an exemplary embodiment of the present invention.
Figure 10:
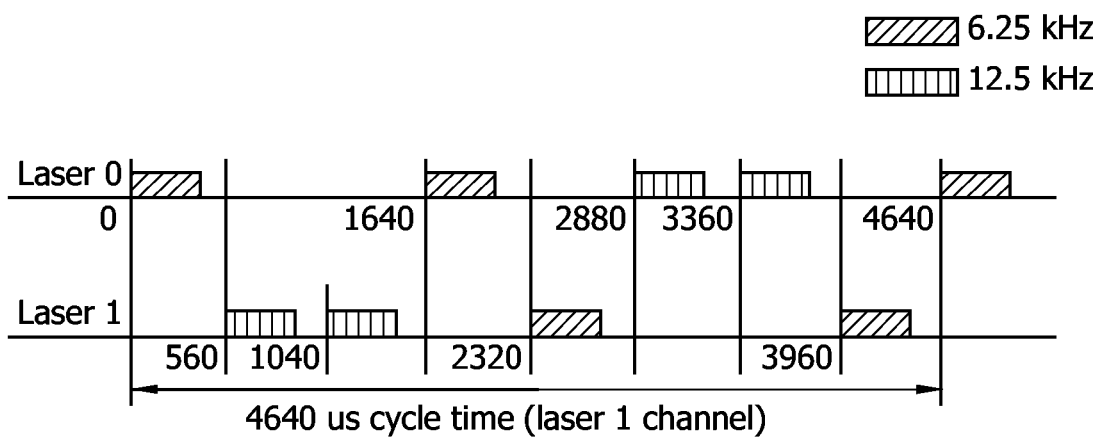
FIG. 10 illustrates schematically a burst plan for measurement mode A in an exemplary embodiment of the present invention.

For medium speeds, data from the 25 kHz and 12.5 kHz modulation rate measurements are combined to obtain phase results, and a burst plan (mode C) comprising 25 kHz and 12.5 kHz modulation rates is shown in FIG. 8, by means of which two lasers may be driven in a time multiplexing mode. Each of the blocks represents a complete modulation sequence. For lower speeds (mode B), data from 25 kHz inter-burst (IB) measurement is added (see the burst plan of FIG. 9) and for the lowest speeds (mode A), data from the inter-burst measurement at 12.5 kHz or 6.25 kHz is added as well (see the burst plan of FIG. 10). For the lower and lowest speeds, by using phase information, i.e. by correlating phase results of successive bursts, further resolution enhancement is obtained. The time interval between the 12.5 kHz bursts in FIG. 10 is different from the time interval between the 6.25 kHz bursts.

The bursts with the largest time interval provide the best measuring resolution, but they can only be used for the lowest speeds.

Thus, for measurement modes C, D and E, only frequency data is available for processing. For modes A and B, however, phase data is used. The phase data (from UD, UU, DD or IE measurements) yield a speed in the form of a phase having a value between $-\pi$ and $+\pi$ such that it oscillates and repeats itself at increasing speed.

The embodiments described above operate at 25 kHz and 12.5 kHz modulation rates, but the same concepts may be used with other pairs of modulation rates, for example, 50 kHz and 6 kHz. The interval between bursts can be adapted to obtain an optimum overlap between the different detection modes so that speeds within a range of more than four orders of magnitude can be determined with an acceptable computing effort.

The table below summarises the burst type definitions for modes A, B, C, D and E in terms of burst type, timing and bandwidth, for the above-described exemplary embodiment of the present invention.

| Burst Type A | Burst Type B | Burst Type C | Burst Type D | Burst Type E |
|---|---|---|---|---|
| 6.25 kHz | | | | |
| 2000 us IB | | | | |
| 160 us UU/DD | | | | |
| 12.5 kHz | 12.5 kHz | 12.5 kHz | 12.5 kHz | |
| 450 us IB | | | | |
| 80 us UU/DD | 80 us UU/DD | 80 us UU/DD | 80 us UU/DD | |
| | 25 kHz | 25 kHz | | 25 kHz |
| | 260 us IB | | | |
| | 40 us UU/DD | 40 us UU/DD | | 40 us UU/DD |
| 3.8 vmax IB | 6.5 vmax IB | | | |
| 0.04 vmin IB | 0.3 vmin IB | | | |
| 21.3 vmax phas | 42.5 vmax phas | 42.5 vmax phas | | |
| 0.5 vmin phas | 1.1 vmin phas | 1.1 vmin phas | | |
| 269 vmax f | 538 vmax f | 538 vmax f | 538 vmax f | 1076 vmax f |
| 12 vmin f | 23 vmin f | 23 vmin f | 23 vmin f | 47 vmin f |

Each of the burst types defined above is suitable for another speed range. The maximum speed that can be determined is given by the number (#) of 2π jumps that a phase can handle, which is maximum 5 in this exemplary embodiment. The minimum speed that can be determined is given by an angle of at least 35 degrees on a phase result. For frequency determination, up to 32 bins shift is considered. A bin is a frequency range in the frequency histogram that is obtained after the (e.g. 128 point) Fast Fourier Transform step. For 50 kHz modulation, such a bin is 125 kHz and for 6.25 kHz modulation, it is 15.6 kHz. The minimum frequency shift is 1 bin for non-phase operation.

Figure 11:
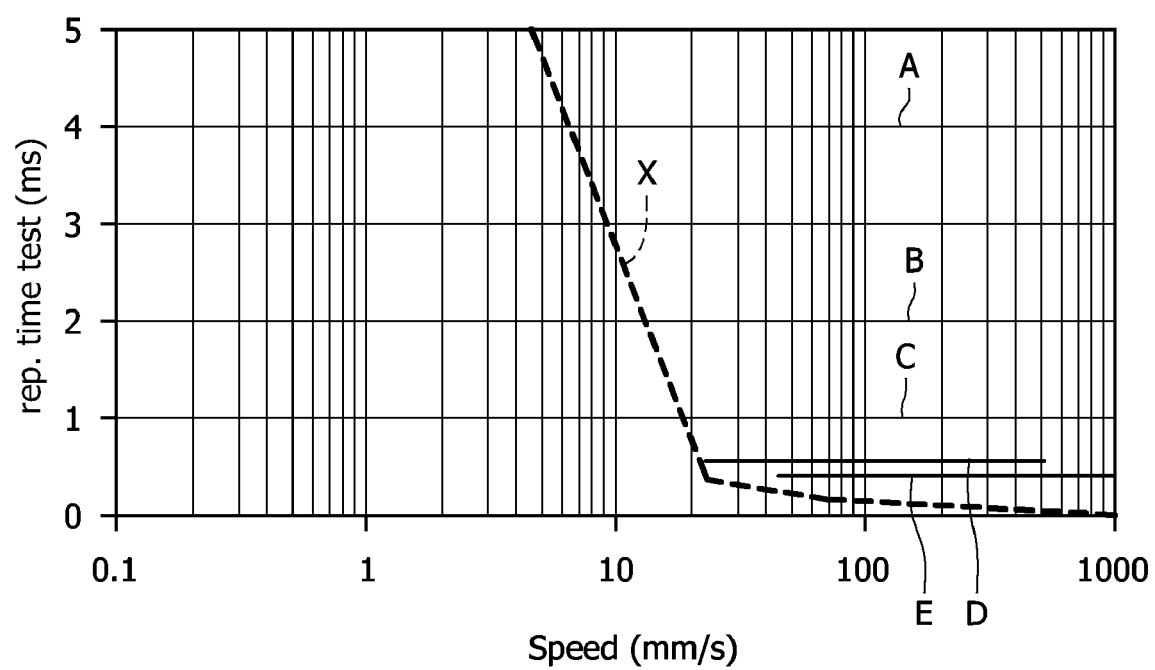
FIG. 11 is a schematic diagram illustrating graphically the measurement repetition rates that can be used for the different measurement modes in an exemplary embodiment of the present invention.

The measurement repetition rates that can be used for the different modes are indicated in FIG. 11.

Operating modes for the different speeds (in mm/sec) are given in the following table:

|   | Decreasing | Increasing |
| --- | --- | --- |
| A | 0.8 | |
| B | 6.4 | 1.6 |
| C | 72 | 12.8 |
| D | 144 | 144 |
| E | | 290 |

The burst repetition rates are 4, 2, 1, 0.5 and 0.5 ms for modes A, B, C, D and E respectively. Switching between the operating modes is performed as a function of the speed. Thus, a hysteresis occurs, which is indicated in the table for increasing and decreasing speed. The hysteresis is identical for all modes. In case the speed selection indicates an acceleration error, the burst mode is always raised, even when no valid speed is reported or when the extrapolated speed does not predict a higher speed. The table shows at which speed a mode is "switched on". For decreasing speed, switching mode A is performed at a speed of 0.8 mm/sec. For increasing speed, switching to mode E is performed at a speed of 290 mm/sec. The difference in speed at which the operating mode is raised or increased is a constant factor, in this example, equal to 2.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of measuring movement of an input device and object (15) relative to each other along at least one measuring axis, the method comprising the steps of illuminating an object surface with a measuring laser beam (13), emitted from the laser cavity of a laser device (3), for each measuring axis, generating a measurement signal representative of changes in operation of the laser cavity, said changes being due to interference of measuring beam radiation re-entering said laser cavity and an optical wave in said laser cavity and being representative of said movement along said at least one measuring axis, selecting, in dependence on the speed of movement of said input device and said object (15) relative to each other, one of at least two parameters of said measurement signal and determining from said selected parameter the speed and direction of said movement, and generating an electric signal representative of said speed and direction of movement.

2. A method according to claim 1, wherein said interference comprises laser self-mixing interference.

3. A method according to claim 1, wherein one of said at least two parameters comprises a phase difference between corresponding events in successive portions of said measurement signal.

4. A method according to claim 1, wherein one of said at least two parameters comprises an offset frequency superposed on said measurement signal.

5. A method according to claim 3, for use in measuring speed of movement within a range of speeds, and said phase difference between corresponding events in successive portions of said measurement signal is selected for determination of speed and direction of movement for a set of lower speeds, including the lowest speed, in said range.

6. A method according to claim 5, wherein the offset frequency superposed on said measurement signal is selected for determination of speed and direction of movement for a set of higher speeds, including the highest speed, in said range.

7. A method according to claim 1, wherein a modulated drive current is applied to said laser device (3), such that said measurement signal is modulated accordingly, said modulated measurement signal including a rising portion and a falling portion in each period thereof.

8. A method according to claim 7, wherein said drive current is adjusted in dependence on the speed of movement of said input device and said object (15) relative to each other.

9. A method according to claim 8, for use in measuring speed of movement within a range of speeds, wherein when the speed of movement is in a first set of speeds, including the highest speed, in said range, said drive current comprises a burst of pulses at a first modulation rate and the speed and direction of movement is determined by comparing the offset frequency of a rising portion of said measurement signal with that of a falling portion in the same period of said measurement signal.

10. A method according to claim 9, wherein when said speed of movement is in a second set of speeds, between a first speed lower than said highest speed and a second speed higher than said lowest speed, the modulation rate of said burst of pulses is reduced to a second modulation rate, lower than said first modulation rate.

11. A method according to claim 10, wherein the ratio of said second modulation rate to said first modulation rate is dependent on the reduction in speed.

12. A method according to claim 10, wherein the speed and direction of movement is determined by comparing the offset frequency of a rising portion of said measurement signal with that of a falling portion in the same period of said measurement signal.

13. A method according to claim 12, wherein when the speed of movement is in a third set of speeds, between a first speed lower than said highest speed and a second speed higher than said lowest speed and including speeds lower than those in said second set of speeds, the drive current comprises a burst of pulses having at least two different modulation rates within a burst.

14. A method according to claim 13, wherein the speed and direction of movement is determined by comparing the offset frequency of two or more rising portions, or two or more falling portions, in successive periods of said measurement signal.

15. A method according to claim 14, wherein the speed of movement is in a fourth set of speeds, between a first speed lower than said highest speed and a second speed and including speeds lower than those in said third set of speeds, said drive current comprises a plurality of bursts of pulses with a time interval there between.

16. A method according to claim 15, wherein the speed and direction of movement is determined by determining the phase difference of corresponding events in successive bursts of the resultant measurement signal.

17. A method according to claim 16, wherein said events have a greater periodicity than that of the rising and falling portions of said measurement signal.

18. A method according to claim 15, wherein the modulation rate of said bursts of pulses is varied according to said speed of movement, with lower modulation rates being included when said speed is in a set of speeds including said lowest speed.

19. An optical module for performing a method of measuring movement of an input device and object relative to each other along at least one measuring axis, the optical module comprising a laser device (3) for each measuring axis, said laser device (3) having a laser cavity for generating a measuring laser beam (13), means for illuminating an object surface with said measuring beam (13), detector means (4) for generating a measurement signal representative of changes in operation of the laser cavity, said changes being due to laser self-mixing interference of measuring beam radiation re-entering said laser cavity and an optical wave in said laser cavity and being representative of said movement along said at least one measuring axis, and electronic processing means (18) for selecting, in dependence on the speed of movement of said input device and said object (15) relative to each other, one of at least two parameters of said measurement signal, determining from said selected parameter the speed and direction of said movement and generating an electric signal representative of said speed and direction of movement.

20. An input device including an optical module according to claim 19.

* * * * *